United States Patent [19]
Genik-Sas-Berezowsky et al.

[11] 4,070,182
[45] Jan. 24, 1978

[54] RECOVERY OF PRECIOUS METALS FROM METAL SULPHIDES

[75] Inventors: Roman M. Genik-Sas-Berezowsky; Verner B. Sefton, both of Edmonton; Lynton S. Gormely, North Vancouver, all of Canada

[73] Assignee: Sherritt Gordon Mines Limited, Toronto, Canada

[21] Appl. No.: 714,060

[22] Filed: Aug. 13, 1976

[30] Foreign Application Priority Data

Feb. 20, 1976  Canada .................................. 246274

[51] Int. Cl.$^2$ ...................... C22B 11/04; C22B 15/10
[52] U.S. Cl. ................................... 75/103; 75/101 R; 75/117; 75/118 R; 75/109; 423/32; 423/36
[58] Field of Search ...................... 75/101 R, 103, 117, 75/118 R, 109; 423/32, 36

[56] References Cited

U.S. PATENT DOCUMENTS

| | | | |
|---|---|---|---|
| 1,891,532 | 12/1932 | Gibson | 75/103 |
| 2,093,958 | 9/1937 | Edguist | 75/103 |
| 2,647,819 | 8/1953 | McGauley | 75/117 X |
| 2,693,404 | 11/1954 | Mackiw | 75/103 X |
| 2,807,533 | 9/1957 | Abramson | 75/118 R X |
| 2,822,263 | 2/1958 | Forward | 75/117 |
| 3,088,820 | 5/1963 | Mackiw et al. | 75/103 X |
| 3,137,600 | 6/1964 | Margulies et al. | 75/103 X |
| 3,669,651 | 6/1972 | Spedden et al. | 75/117 X |
| 3,975,190 | 8/1976 | Van der Meulen et al. | 75/101 R |

*Primary Examiner*—G. Ozaki
*Attorney, Agent, or Firm*—Robert F. Delbridge; Arne I. Fors

[57] ABSTRACT

Gold, as well as copper, is recovered from copper bearing sulphidic material containing gold. The copper bearing sulphidic material is subjected to a main leach to provide a copper containing main leach liquor and a main residue. A secondary leach with ammonium thiosulphate solution is carried out on the copper bearing sulphidic material before the main leach, or on the residue from the main leach, to provide a gold containing secondary leach liquor and a secondary residue. Copper and gold are recovered from the respective leach liquors. Silver may also be recovered in addition to the gold.

29 Claims, 3 Drawing Figures

RECOVERY OF PRECIOUS METALS FROM METAL SULPHIDES

This invention relates to the recovery of gold, and possibly also silver, as well as copper, from copper bearing sulphidic material which also contains such metals. Such material may, for example, be chalcopyrite.

It has been proposed to recover copper from copper bearing sulphidic material such as chalcopyrite material by means of a hydrometallurgical process in which the ore is leached under oxidizing conditions to provide a substantially iron-free copper-containing leach solution, from which the copper is recovered. One such process is described in U.S. Pat. No. 2,822,263.

Copper bearing sulphidic materials, such as chalcopyrite, frequently contain small amounts of precious metals such as gold and silver and, in view of the present day value of these metals, it would be commercially advantageous if they too could be recovered. Although the problem of recovering precious metals, as well as a main element such as copper, has received much attention in the past, much of the work in this connection has been concerned, so far as commercial operations are concerned, with the recovery of precious metals in conjunction with pyrometallurgical processes for the recovery of the main element. So far as applicant is aware, little work has been carried out to provide commercially feasible methods of recovering precious metals in conjunction with hydrometallurgical processes for extraction of a main element such as copper from copper bearing sulphidic materials.

In a commercial operation for the recovery of precious metals as well as a main element, it is necessary for successful commercial operation that the method of recovery of the precious metals be compatible with the hydrometallurgical process for recovery of the main element.

Generally speaking, for commercial operations, the teaching of the prior art for the recovery of precious metals in these circumstances has been by cyanidation. However, such a method would not be commercially practical for use in conjunction with the hydrometallurgical process for the recovery of copper referred to above, since a number of problems arise if cyanidation is used with copper bearing sulphidic materials. In addition, of course, the use of cyanide is not desirable because of its toxicity. Sodium sulphite and thiourea have been proposed as possible alternatives, but have not yet been shown to be commercially attractive.

According to the present invention, it has been found that ammonium thiosulphate can be used in a secondary leach for the recovery of gold, and possibly also silver, in conjunction with hydrometallurgical processes of the kind mentioned above for the recovery of copper from copper bearing sulphidic materials. With the present invention, not only is the precious metal recovery treatment compatible with the hydrometallurgical process for the recovery of copper, but the precious metal recovery treatment can be carried out either before or after the copper recovery leach, with minimum loss of thiosulphate, and with the precious metals being leached out into a solution from which their recovery is commercially feasible. Minimal loss of ammonium thiosulphate has, of course, economic importance in a commercial operation, as also has the ease of extraction of gold, and possibly also silver, from the thiosulphate leach solution. Additionally, from a commercial point of view, it has also been found that satisfactory results can be produced without any initial roasting of the copper bearing sulphidic material, thereby saving the considerable cost of such a step.

The main leach for the recovery of copper may be carried out with an ammonium salt containing ammoniacal aqueous leach medium, preferably at a temperature above 25° C. and at a pressure above atmospheric pressure with a partial pressure of oxygen of at least 5 pounds per square inch gauge (p.s.i.g.). The ammonium salt may be ammonium sulphate. Alternatively, the main leach may be a so-called super leach carried out in water or dilute acid at relatively high temperatures and oxygen partial pressures, for example, temperatures in the range of 160° C. to 230° C. and oxygen partial pressures in the range of 50 p.s.i.g. to 200 p.s.i.g. In both types of main leach, the major portion of the sulphide sulphur is converted to sulphate form.

Where the thiosulphate leach is carried out after a main leach of this super leach kind, the main residue is preferably conditioned with a strong base such as sodium hydroxide, calcium hydroxide or ammonium hydroxide before the thiosulphate leach.

It may be preferred to treat the main leach residue rather than an initial concentrate for the recovery of precious metals, because a smaller volume of material is involved. Thus, as far as the cost of equipment is concerned, it is more economical to treat the main leach residue rather than the concentrate.

Although gold recoveries are substantially the same whether the initial concentrate or the main leach residue is subjected to the thiosulphate leach, it has been found that silver recovery is frequently less from a thiosulphate leach of the concentrate than from a thiosulphate leach of the main leach residue, unless a concentrate is subjected to a prior oxidation step. On the other hand, however, thiosulphate leaching of the concentrate rather than the main leach residue may be preferred because liquid/solids separation after thiosulphate leaching of the concentrate may be easier than liquid/solids separation after thiosulphate leaching of the main leach residue. Which alternative is preferred in any particular case, therefore, depends upon the various factors mentioned above.

Initially, the concentrate or the main leach residue is slurried in ammonium thiosulphate solution. It should be mentioned here that, where the concentrate is being treated, it should only be lightly ground so as merely to break up any agglomerations. It has been found that if the concentrate is ground to too fine a state, the finer ground particles may promote the precipitation of some of the soluble copper as a sulphide which may, in turn, cause precipitation of solubilized gold. Preferably, the concentrate particle size should be in the range of 60% minus 200 mesh to 95% minus 325 mesh.

It has also been found that, for efficient extraction, there should be a significant amount of cupric ions, $Cu^{2+}$, present during the ammonium thiosulphate leach so that the cupric ammine ion $(Cu_2(NH_3)_4^{2+})$ is formed. Such a concentration of cupric ions may be provided by adding cupric ions or by producing them in situ, as will appear later. So far as treatment of the main leach residue is concerned, not all the copper will have been removed in the main recovery leach and, hence, some will be present in the main leach residue. Generally speaking, cupric ions should be added to provide a cupric ion concentration in the range of from 1 to 10 g.p.l. and preferably from 2 to 4 g.p.l.

The concentration of ammonium thiosulphate in the slurry should be in the range of from 15 to 150 g.p.l. and preferably from 60 to 120 g.p.l. Since precipitation of soluble copper, along with some of the gold and silver, may occur after a significant percentage of the gold has dissolved, the time of the leach should not be unduly prolonged. Better results, so far as gold extraction is concerned, may be obtained after leaching for 1 hour, for example, than after leaching for longer periods.

The ammonia content of the thiosulphate leach solution should preferably be controlled so that there is a significant amount of free ammonia in the leach solution, with the free ammonia to soluble metals molar ratio being at least 4:1, and preferably at least 8:1.

So far as leaching temperatures are concerned, the temperature should be in the range from 20° to 65° C., preferably between 25° and 50° C. At lower temperatures, the rate of extraction is undesirably slow, while at higher temperatures, an undesirable amount of copper may be precipitated as a sulphide, due to the decomposition of thiosulphate, with consequent reduction of gold extraction.

Further, it has been found that the presence of oxygen or other suitable oxidant assists the thiosulphate leaching process, although it is necessary that the conditions do not favour the degradation of the thiosulphate by oxidation. There should be sufficient oxygen to keep the copper in solution with at least some of the copper as cupric ions, with minimum oxidation of the thiosulphate. The use of air as oxidant, even in the absence of added copper, improves the gold extraction while the addition of cupric ions further improves the results. It appears that with air sparging, with no added cupric ions, such ions are formed in situ.

The thiosulphate leach may be carried out substantially at atmospheric pressure in the presence of free oxygen or in an inert atmosphere such as a nitrogen atmosphere. Pressures slightly above atmospheric may also be useful.

Insofar as the recovery of precious metals from the thiosulphate leach liquor is concerned, various methods may be used. However, it has been found that, with the process of the present invention, cementation with zinc dust provides a commercially useful and effective method of precipitating the precious metals from solution. Preferably, cupric ions in the solution are first reduced to cuprous ions so as to decrease the amount of zinc dust required. Such reduction can be carried out with sulphur dioxide.

Embodiments of the present invention will now be described, by way of example, with reference to the accompanying drawings, in which.

Figure 1:
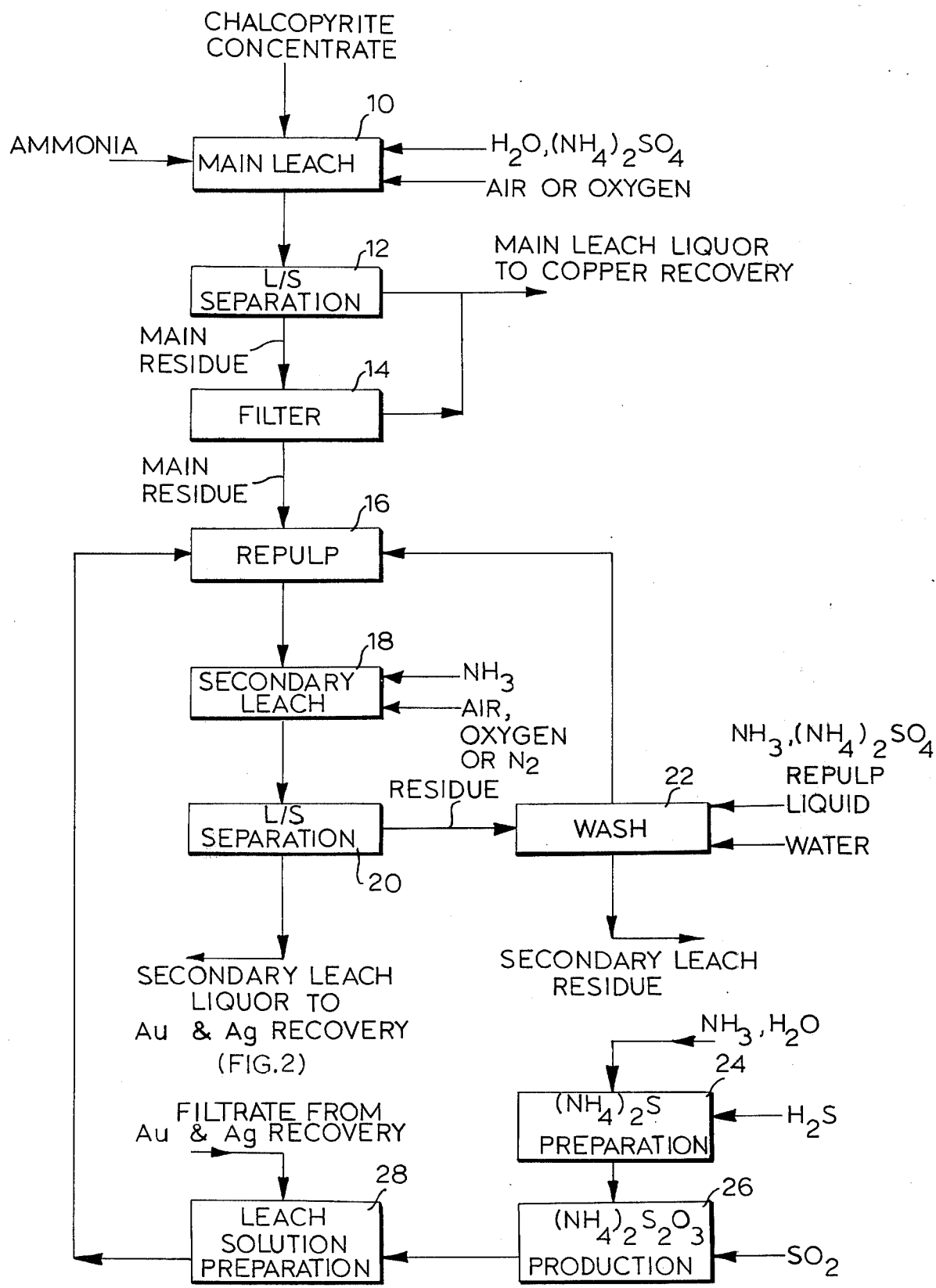
FIG. 1 is a flow diagram of a hydrometallurgical process for the extraction of copper from chalcopyrite concentrate in conjunction with, according to one embodiment of the invention, the recovery of gold and silver from the main leach residue.

Referring first to FIG. 1 of the accompanying drawings, chalcopyrite concentrate is leached in a main leaching step 10 with ammonium sulphate containing ammoniacal aqueous leach medium being carried out under oxidizing conditions. The concentrate may typically contain, for example, 25% copper, 29% iron, 4% zinc, 33% sulphur, 0.175 ounces per ton gold and 4.6 ounces per ton silver. One such process is described in the previously mentioned U.S. Pat. No. 2,822,263.

As described in this United States patent, the main leach is preferably carried out at a temperature above 25° C. and at a pressure above atmospheric pressure with a partial pressure of oxygen above 5 pounds per square inch gauge.

After the main leach, the leach end slurry is passed to a liquid-solids separation step 12, utilizing a thickener, where overflow is subsequently processed for copper recovery as described in U.S. Pat. No. 2,822,263 mentioned above. The underflow is then filtered in a filtering step 14, with the filtrate also being passed to the copper extraction step. The resultant residue then proceeds to a repulp step 16 where it is repulped with a leach solution and a wash solution, as will be described in more detail later.

The resultant slurry then passes to a thiosulphate (or secondary) leaching step 18. The thiosulphate leach is carried out in a vessel in which the slurry is well agitated, and is carried out under atmospheric conditions, preferably in the presence of oxygen or air, or under an inert atmosphere such as nitrogen. Ammonia is also supplied to the thiosulphate leach step 18.

After the thiosulphate leach, the leach end slurry proceeds to a liquid-solids separation step 20 from which the thiosulphate leach liquor passes to gold and silver recovery treatment, as will be described later with reference to FIG. 2. The residue from the liquid-solids separation step 20 passes to a washing step 22 where this secondary residue is washed and repulped with ammonia, ammonium sulphate and water. The wash liquid is then recirculated back to the repulp stage 16, and the washed leach residue is discarded.

It was previously mentioned that the repulp stage 16 is also provided with leach solution. Initially, ammonium sulphide is prepared as indicated in step 24 from water, ammonia and hydrogen sulphide, and the resultant ammonium sulphide is passed to an ammonium thiosulphate production step 26 to which sulphur dioxide is supplied. The ammonium thiosulphate then passes to a leach solution preparation step 28 which also receives filtrate from the gold and silver recovery treatment which will be described later with reference to FIG. 2. The resultant leach solution is then passed to the repulp step 16. After the original thisulphate requirements of the system have been met, only make-up thiosulphate will be prepared in step 26, since most of the thiosulphate used in the secondary leach is recovered and recirculated.

The cupric ammine requirements of the thiosulphate leach are generally met by a small quantity of soluble copper entrained as main leach liquor entering the thiosulphate leach circuit with the main leach residue. If additional cupric ammine ions are required, a small portion of the main leach liquor may be diverted to the repulp step 16 or the secondary leach 18. Preferably, the thiosulphate leach is carried out in such a manner that the thiosulphate leach product liquor will contain at least a portion, preferably a major portion, of the soluble copper in the reduced cuprous state.

Figure 2:
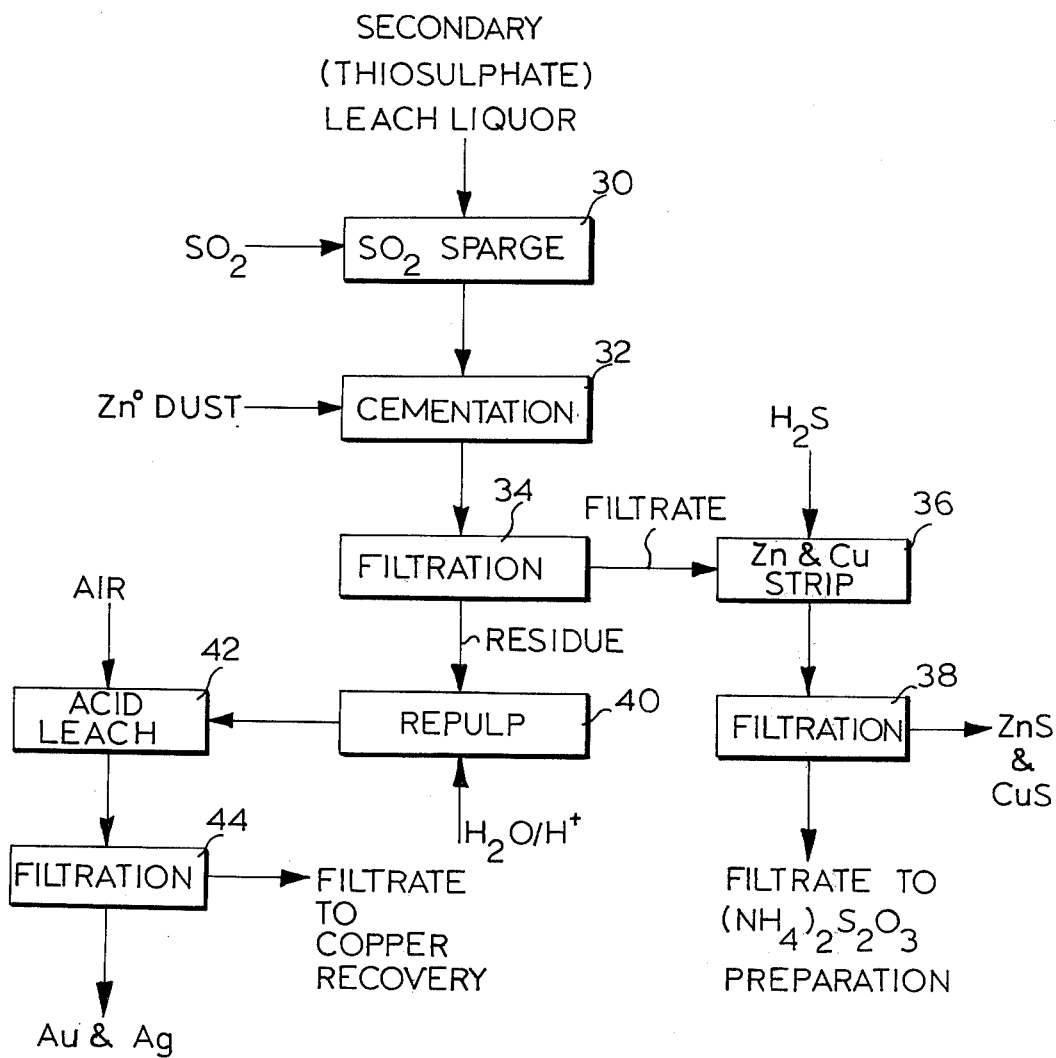
FIG. 2 is a flow diagram showing a preferred method of extraction of gold and silver from the thiosulphate leach liquor obtained in the process shown in FIG. 1.

Referring now to FIG. 2, the thiosulphate leach liquor from the liquid separation step 20 of FIG. 1 is passed to a sparging step 30, where the liquor is sparged with sulphur dioxide so as to reduce substantially all the remaining cupric ions present to cuprous ions. The resultant liquor then passes to a cementation step 32 where zinc dust is added so as to cause precipitation of gold and silver as well as at least a portion of the copper.

The resultant mixture is filtered in a filtration step 34, and the filtrate passes to a strip step 36 where the zinc and copper are precipitated as a mixed zinc-copper sulphide by hydrogen sulphide. This mixture is filtered in a filtration step 38 with consequent recovery of the zinc and copper sulphides, which may be sent to the main leach. The filtrate from the filtration step 38 is then passed to the leach solution preparation step 28 of FIG. 1. Residual or excess hydrogen sulphide (present as ammonium sulphide) in the filtrate after the bulk sulphide removal may be reacted with $SO_2$ as in step 26 to prepare make-up thiosulphate prior to step 28.

The secondary residue or cement product from the filtration step 34, which residue contains the gold and silver, as well as zinc, copper and sulphur, passes to repulp step 40 where it is repulped with water and acid. The resulting slurry is treated in an acid leach step 42 under oxidizing conditions caused by the addition of air. The conditions of this acid leach are such that the major portion of copper and zinc are leached into solution with the gold and silver remaining in the residue. The resultant product is then filtered in a filtration step 44, with the filtrate being recycled to the copper extraction step along with the leach liquor from the original main leach separation step 12. The resultant residue from the filtration step 44 is a gold/silver concentrate suitable for further refining by conventional commercial methods.

As an alternative to the acid leach step 42, the zinc and copper may be removed in a mildly oxidizing leach, for example in ammoniacal ammonium sulphate or in a portion of the cupric ammine-containing liquor of the main leach.

Figure 3:
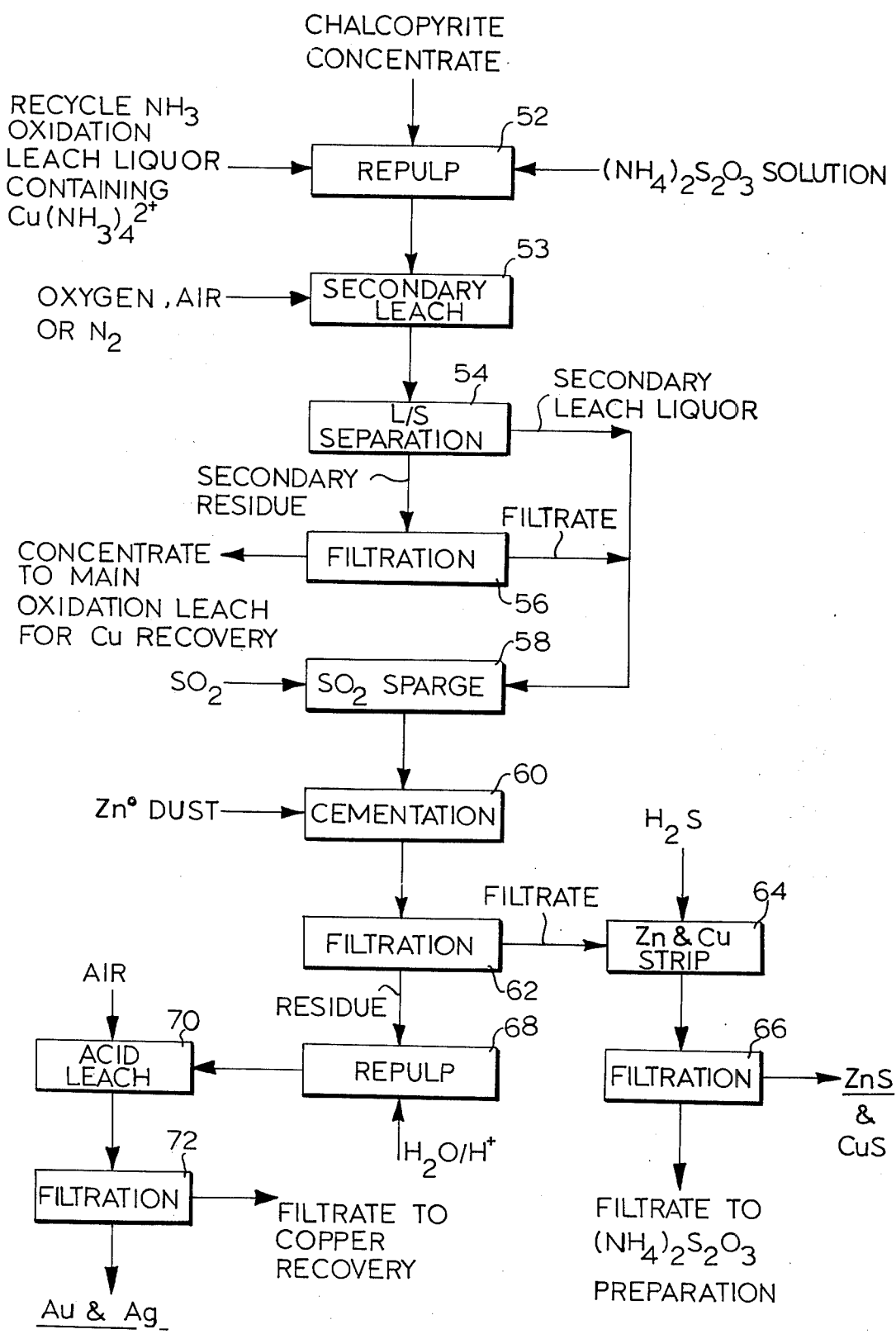
FIG. 3 is a flow diagram showing the extraction of precious metals, in accordance with a second embodiment of the invention, from chalcopyrite concentrate.

FIG. 3 shows another embodiment of the invention in which, instead of the main leach residue being treated for recovery of precious metals as in the embodiment described with reference to FIGS. 1 and 2, the chalcopyrite concentrate is treated for the recovery of precious metals before the main leaching step for extraction of copper.

The chalcopyrite concentrate, preferably after a light grind to break up major lumps and reduce size to about 60% minus 325 mesh, is repulped in a repulping step 52 with ammonium thiosulphate solution and recycled ammonia leach liquor containing cupric ammine ions.

The resultant slurry is then leached in a secondary leach step 53, the leach being carried out in a suitable vessel with adequate agitation and under atmospheric conditions with either an air or oxygen sparge or under nitrogen.

The leach end slurry then passes to a liquid-solids separation step 54, utilizing a thickener, with the underflow therefrom being filtered in a filtration step 56. The secondary residue from the filtration step 56, comprising relatively unaltered concentrate, is then passed to the main leach for the recovery of copper.

The overflow from the liquid-solids separation step 54 and the filtrate from the filtration step 56 are combined and then treated in a sparging step 58 with a sulphur dioxide sparge. The sparge and subsequent treatment are similar to those described in connection with FIG. 2. The sparged liquor passes to a cementation step 60 where cementation is carried out with zinc dust, and the product is filtered in a filtration step 62. The filtrate therefrom is treated with hydrogen sulphide in a zinc and copper stripping step 64 which produces a mixed sulphide and this sulphide is separated from the filtrate in a filtration step 66. The filtrate is then used in an ammonium thiosulphate preparation step (not shown) from which ammonium thiosulphate is supplied to the repulp step 52.

The residue from the filtration step 62 is repulped in a repulping step 68 with water and acid, and the resulting mixture passed to an acid leach step 70, where leaching is carried out under oxidizing conditions so as to leach out the major portion of copper and zinc, with silver and gold remaining undissolved. The silver and gold are separated from the filtrate in a filtration step 72, and the filtrate, which contains copper and zinc, is added to the residue from the filtration step 56 and passed to the main leach for the extraction of copper. The residue from the filtration step 72 is, as in the previous embodiment, a gold/silver concentrate suitable for refining by conventional commercial methods.

Various specific examples of the invention will now be described.

EXAMPLE 1

A chalcopyrite concentrate was leached with an ammonium sulphate containing ammoniacal aqueous leach medium. The concentrate containing 25.3% Cu, 28.7% Fe, 3.26% Zn, 33.2% S, 0.188 oz/ton Au and 4.58 oz/ton Ag, with the copper, iron and sulphur being primarily present as the compounds $CuFeS_2$ and $FeS_2$. The leach was carried out with 240 g.p.l. concentrate at 82° C. under an initial oxygen overpressure of 20 p.s.i.g. with the leach medium containing initially 100 g.p.l. ammonium sulphate and excess free ammonia. The leach was continued for 8 hours and 98.1% Cu and 84.8% S were extracted. The residue was filtered, repulped first in $NH_3/(NH_4)_2SO_4$ solution, then in water and dried.

The residue from the main leach described above was then prepared for an ammonium thiosulphate leach for the extraction of gold and silver. The slurry for the ammonium thiosulphate leach contained 400 g.p.l. of the ammonia leach residue (which is equivalent to a maximum precious metals content of 4.17 mg/l Au and 107 mg/l Ag) and 100 g.p.l. ammonium thiosulphate, with sufficient ammonia being added to bring the pH to between 9.5 and 10.0.

Two thiosulphate leaches were carried out, one with and one without added cupric ions. The leaches were carried out at 49° C. with a nitrogen purge and strong agitation. The cupric ions in the first case were added in the form of leach liquor from the main leach, this liquor containing 55 g.p.l. Cu and 100 g.p.l. free $NH_3$. Sufficient liquor (100 ml/l) was added to give a level of from 5–6 g.p.l. cupric ions. Samples were taken after thiosulphate leach times of 2, 4 and 6 hours and the results are shown in Table I.

TABLE I

| Main Leach Liquor Added (ml/l) | Time (hr) | Residue Assays (oz/T) Au | Ag | Extractions (%) Au | Ag |
|---|---|---|---|---|---|
| Main leach residue | — | 0.304 | 7.83 | — | — |
| 0 | 2.0 | 0.102 | 1.52 | 66.4 | 80.6 |
|  | 4.0 | 0.086 | 1.36 | 71.2 | 82.6 |
|  | 6.0 | 0.062 | 1.20 | 79.6 | 84.7 |
| 100 | 2.0 | n.a.* | 0.89 | n.a.* | 88.6 |

TABLE I-continued

| Main Leach Liquor Added (ml/l) | Time (hr) | Residue Assays (oz/T) Au | Residue Assays (oz/T) Ag | Extractions (%) Au | Extractions (%) Ag |
|---|---|---|---|---|---|
| | 4.0 | 0.020 | 1.04 | 93.4 | 86.7 |
| | 6.0 | 0.017 | 0.97 | 94.4 | 87.6 |

*not analyzed.

The results show a dramatic improvement in the leach rate and extraction of gold in the presence of added cupric ions, namely from 71.2 to 93.4% at 4 hours and from 78.6 to 94.4% after 6 hours. Silver extractions were marginally improved by about 3–8% to 86–89%.

It is interesting to note that appreciable extractions of gold and silver were obtained even in the absence of added cupric ions. It is believed that this is because surface oxidation may have occurred during the drying of the residue and contributed in part to the improved extractions by providing oxidant. The less favourable results obtained with a washed but undried residue are apparent from the following example.

EXAMPLE 2

In this case, two main leaches were carried out, one at 82° C. with an unground concentrate (42.2% minus 325 mesh) and one at 93° C. with a concentrate ground for 0.5 hours in a steel ball mill. The main leach of unground concentrate extracted 93.3% Cu, and the leach of ground concentrate extracted 98.6% Cu.

Prior to the thiosulphate leach, the residues were settled, thickened and filtered to approximately 50% solids, and then were either treated directly with thiosulphate (i.e. unwashed) or were first well washed by repulping twice with 45/200 $NH_3/(NH_4)_2SO_4$ solution and water but not dried. The thiosulphate leaches contained 130–140 g.p.l. solids (dry basis) in 100 g.p.l. thiosulphate and were carried out at 49° C. with strong agitation and a nitrogen purge.

Samples were taken initially and after leach times of 1, 2 and 5 hours. The results are shown in Table II.

TABLE II

| Main Leach Conditions | | | | Ammonium Thiosulphate Leach | | | | | | | | | |
|---|---|---|---|---|---|---|---|---|---|---|---|---|---|
| | | | | | | Residue Assays | | | | | | Extractions | |
| Temp (° C) | Grind (hrs) | % Cu Extr. | Residue Treatment | Time (hrs) | Slurry pH | Cu (%) | Fe (%) | Zn (%) | S (%) | Au (oz/T) | Ag (oz/T) | Au (%) | Ag (%) |
| 82 | 0 | 93.3 | | 0 | 8.5 | 2.58 | 46.7 | 4.27 | 16.7 | 0.284 | 6.71 | | |
| | | | Well washed | 1 | 8.5 | | | | | 0.174 | 3.91 | 38.7 | 41.7 |
| | | | | 2 | | | | | | 0.162 | 3.44 | 43.0 | 48.7 |
| | | | | 5 | | 2.31 | 46.5 | 4.03 | 16.7 | 0.118 | 2.77 | 58.5 | 58.7 |
| | | | Unwashed | 1 | 9.7 | | | | | 0.038 | 2.04 | 86.6 | 69.6 |
| | | | | 2 | | | | | | 0.032 | 1.90 | 88.7 | 71.7 |
| | | | | 5 | | 2.46 | 48.6 | 4.23 | 17.3 | 0.023 | 1.49 | 91.9 | 77.8 |
| 93 | 0.5 | 98.6 | | 0 | | 0.588 | 49.2 | 3.03 | 17.5 | 0.301 | 7.06 | | |
| | | | Well washed | 1 | 8.5 | | | | | 0.172 | 3.70 | 42.9 | 47.6 |
| | | | | 2 | | | | | | 0.133 | 2.45 | 55.8 | 65.3 |
| | | | | 5 | | 0.503 | 50.8 | 3.62 | 17.5 | 0.116 | 1.60 | 61.5 | 77.3 |
| | | | Unwashed | 1 | 9.5 | | | | | 0.036 | 1.23 | 88.0 | 82.6 |
| | | | | 2 | | | | | | 0.033 | 1.17 | 89.0 | 83.4 |
| | | | | 5 | | 0.519 | 54.4 | 2.25 | n.a. | 0.018 | 1.08 | 94.0 | 84.7 |

It is clear that much better results were obtained with the unwashed residue containing appreciable soluble copper as entrained primary leach liquor. In these tests, the washed residues from the ammonium leach were subjected to the thiosulphate leach directly after washing. This is in contrast to the tests in Example 1 where the residue was dried after washing, with improved results.

EXAMPLE 3

The thiosulphate leaching described in Example 1 was carried out directly on the chalcopyrite concentrate in a slurry containing 400 g.p.l. solids, i.e. before the main leach to extract copper, the concentrate having first been lightly ground to 63% minus 40 micron (38% minus 20 $\mu$). In addition, two leaches were carried out at ambient temperature (22° C.) in sealed porcelain jars for several days and subjected to gentle agitation on rollers employed for ball milling. The results are shown in Table III.

TABLE III

| | Thiosulphate Leach Conditions | | | | Products | | | | |
|---|---|---|---|---|---|---|---|---|---|
| Leach Vessel | Temp (° C) | Main Leach Liquor Added (ml/l) | Leach Time (hr) | pH | Filtrate (g/l) Cu | Residue Assays (oz/Ton) Au | Residue Assays (oz/Ton) Ag | Extractions (%) Au | Extractions (%) Ag |
| | | | | | | 0.188 | 4.58 | | |
| Baffled, well | 49 | 0 | 2 | 9.5–10.0 | | 0.156 | 4.24 | 17.0 | 7.4 |
| agitated with | | | 4 | " | | 0.117 | 4.39 | 37.8 | 4.2 |
| overhead stirrer | | | 6 | 9.55 | 0.56 | 0.127 | 4.15 | 32.4 | 9.4 |
| | | 100 | 2 | 9.5–10.0 | | 0.021 | 4.28 | 88.6 | 6.6 |
| | | | 4. | | | 0.026 | 3.87 | 86.2 | 15.5 |
| | | | 6 | 9.5 | 5.16 | 0.046 | 4.05 | 75.5 | 11.6 |
| Sealed | 22 | 0 | 24 | 9.5–10.0 | | 0.022 | 4.07 | 88.3 | 11.1 |
| jars on rollers | | | 48 | | | 0.032 | 4.03 | 83.0 | 12.0 |
| | | | 72 | | 0.147 | 0.156 | 4.16 | 17.0 | 0 |
| | | 100 | 24 | 9.5–10.0 | | 0.033 | 4.40 | 82.4 | 3.9 |
| | | | 48 | | | 0.047 | 4.24 | 75.0 | 7.4 |
| | | | 72 | | 2.76 | 0.070 | 4.45 | 62.8 | 2.9 |

The effect of the added cupric ions on the 49° C. leaching of gold was even more pronounced than in the case of the main leach residue of Example 1, since the extractions were increased from 17–28% after 2–6 hours to almost 89% after 2 hours. Silver extractions were marginally improved but were still very low at 11 ±4%. It is therefore clear that the silver is much more tightly held in the concentrate.

It is interesting to note that the 6 hour solution sample of the "Cu-free" leach contained 0.56 g.p.l. Cu which was presumably derived from surface oxidation of the sulphides during grinding or storage. Thus, leaching of gold with no added cupric ions may have been primarily due to the presence of small amounts of soluble g.p.l. added cupric ions and a nitrogen purge. The concentrate referred to in Example 3 was used. The concentration of ammonium thiosulphate was varied from 13–130 g.p.l. and the results are shown in Table IV.

TABLE IV

| Nominal Initial $(NH_4)_2S_2O_3$ (g/l) | Time (hr) | Solution Assays (g/l) | | | | | | Residue - Au | |
|---|---|---|---|---|---|---|---|---|---|
| | | Cu | Δ Cu | $S_T$ | $S(S_2O_3^=)$ | $NH_{3F}$ | pH | Assays (oz/ton) | Extn (%) |
| 13 | 0 | 5.74 | | | | 27.0 | 9.45 | 0.188 | — |
| | 0.5 | | | | | 22.5 | 9.35 | 0.069 | 63.3 |
| | 1.0 | | | | | 18.5 | 9.10 | 0.050 | 73.4 |
| | 2.0 | | | | | 12.5* | 9.00 | 0.047 | 75.0 |
| | 4.0 | 3.67 | −2.07 | 16.8 | 7.30 | 13.5 | 9.10 | 0.055 | 70.7 |
| 32.5 | 0 | 5.74 | | | | 27.0 | 9.4 | 0.188 | — |
| | 0.5 | | | | | 23.0 | 9.2 | 0.036 | 80.9 |
| | 1.0 | | | | | 21.5 | 9.2 | 0.034 | 81.9 |
| | 2.0 | 4.13 | −1.61 | 24.5 | 15.4 | 18.0 | 9.1 | 0.044 | 76.6 |
| 65 | 0 | 5.74 | | | | 26.5 | 9.2 | 0.188 | — |
| | 0.5 | | | | | 23.2 | 9.15 | 0.034 | 81.9 |
| | 1.0 | | | | | 20.0 | 9.1 | 0.020 | 89.4 |
| | 2.0 | 4.96 | −0.78 | 39.3 | 30.1 | 16.5 | 9.0 | 0.029 | 84.6 |
| 130 | 0 | 4.30 | | | | 25.5 | 9.6 | 0.188 | — |
| | 0.5 | | | | | 23.0 | 9.3 | 0.034 | 81.9 |
| | 1.0 | | | | | 19.8 | 9.25 | 0.022 | 88.3 |
| | 2.0 | 5.13 | +0.83 | 69.1 | 59.4 | 17.5 | 9.2 | 0.016 | 91.5 |

*Make-up NH$_4$OH added.

copper in the feed solids.

It will also be noted that the extended time, ambient temperature leaches provide some interesting results. In the leach with 5.5 g.p.l. of added cupric ions, gold extractions decreased with time from 82.4% to 75.0% and 62.8% after 24 hours, 48 hours and 72 hours respectively. Since the cupric ion level in the final solution had dropped to 2.76 g.p.l. this suggests that some of the solubilized gold had precipitated with the copper, and that optimum gold extraction had been obtained within the first 24 hours.

The ambient temperature leach in the absence of added cupric ions showed remarkably high initial gold extractions of 88.3% and 83.0% after 24 hours and 48 hours respectively. It is possible that appreciable levels of soluble cupric ions derived from surface-oxidized concentrate were responsible. The 72 hour sample contained 0.147 g.p.l. cupric ions suggesting that some of the cupric ions and initially solubilized gold had precipitated lowering the gold extraction to 17% at 72 hours. (The 24 hour and 48 hour levels of cupric ions were not determined, but subsequent tests indicated the solubilization of at least 1.0 g.p.l. Cu during the initial stages of leaching).

EXAMPLE 4

Tests were carried out to determine the effect of different ammonium thiosulphate concentrations in the leach. The leach was carried out at 49° C. with 5.74

The results show that even at a thiosulphate level of only 13 g.p.l., a high gold extraction of almost 75% is achieved within 1 hour. However, for optimum gold solubilization, the minimum concentration of ammonium thiosulphate required is somewwhere in the range of 65–130 g.p.l. At 65 g.p.l. the initial gold extraction was high, namely, 89% after 1 hour, but is appears that copper precipitation took place after this and reduced the gold extraction to 84% after 2 hours. This is deduced from the fact that cupric ion concentration had decreased from the initial 5.74 g.p.l. to 4.96 g.p.l. at this time, representing a loss of 0.78 g.p.l. cupric ions from solution (shown in the Table as ΔCu).

Precipitation of copper also took place at 13 g.p.l. and 32 g.p.l. ammonium thiosulphate, resulting in lower gold extractions. At 130 g.p.l. ammonium thiosulphate, gold extraction of 91.5% was obtained in 2 hours, with there being a slight increase in cupric ions from 4.30 g.p.l to 5.13 g.p.l. (The initial cupric ion concentratin was 4.30 g.p.l. in this specific instance rather than 5.74 g.p.l. as before).

EXAMPLE 5

Tests were then carried out with the concentrate to determine the effects of thiosulphate leach temperature. The conditions were otherwise the same as in Example 4, with 5.74 g.p.l. cupric ions being added and the thiosulphate concentration being 130 g.p.l. The results are shown in Table V.

TABLE V

| Temp (° C) | Time (hr) | Solution Assays (g/l) | | | | | | Residue - Au | |
|---|---|---|---|---|---|---|---|---|---|
| | | Cu | Δ Cu | $S_T$ | $S(S_2O_3^=)$ | $NH_{3F}$ | pH | Assays (oz/ton) | Extn (%) |
| 25.6 | 0 | 5.74 | | | | 25.0 | 10.2 | 0.188 | — |
| | 0.5 | | | | | 24.5 | 10.1 | 0.036 | 80.9 |
| | 1.0 | | | | | 23.5 | 10.1 | 0.029 | 84.6 |
| | 2.0 | | | | | 23.0 | 10.1 | 0.022 | 88.3 |
| | 4.0 | | | | | 19.5 | 10.0 | 0.018 | 90.4 |
| | 6.0 | 6.70 | +0.96 | 70.2 | 58.8 | 14.0 | 10.0 | 0.018 | 90.4 |
| 48.9 | 0 | 4.30 | | | | 25.5 | 9.6 | 0.188 | — |
| | 0.5 | | | | | 23.0 | 9.3 | 0.034 | 81.9 |
| | 1.0 | | | | | 19.8 | 9.25 | 0.022 | 88.3 |
| | 2.0 | 5.13 | +0.83 | 69.1 | 59.4 | 17.5 | 9.2 | 0.016 | 91.5 |
| 65.6 | 0 | 5.74 | | | | 24.0 | 9.9 | 0.188 | — |
| | 0.5 | | | | | 18.5 | 9.8 | 0.028 | 85.1 |
| | 1.0 | | | | | 10.5* | 9.7 | 0.050 | 73.4 |
| | 2.0 | | | | | 21.0 | 9.8 | 0.113 | 39.9 |
| | 3.0 | 0.38 | −5.36 | 72.1 | 55.6 | 13.2 | 9.7 | 0.146 | 22.3 |

TABLE V-continued

| Temp (° C) | Time (hr) | Solution Assays (g/l) | | | | | | Residue - Au | |
|---|---|---|---|---|---|---|---|---|---|
| | | Cu | Δ Cu | $S_T$ | $S(S_2O_3^=)$ | $NH_{3F}$ | pH | Assays (oz/ton) | Extn (%) |
| 82.2 | 0 | 5.74 | | | | 30.0 | 9.95 | 0.188 | — |
| | 0.5 | | | | | 21.5 | 9.90 | 0.051 | 72.9 |
| | 1.0 | | | | | 20.5 | 9.80 | 0.136 | 27.7 |
| | 2.0 | 0.283 | −5.46 | 78.2 | 62.1 | 18.0 | 9.75 | 0.173 | 8.0 |
| 98.8 | 0 | 5.74 | | | | 31.5 | 10.25 | 0.188 | — |
| | 0.5 | | | | | 16.0 | 9.60 | 0.188 | 0 |
| | 1.0 | | | | | 15.5 | 9.55 | 0.177 | 5.9 |
| | 2.0 | 0.167 | −5.57 | 67.3 | 52.5 | 15.0 | 9.55 | 0.177 | 5.9 |

*Make-up NH₄OH added

Gold extractions of 90% were obtained at 25.6° C. in 4 hours and 2 hours at 48.9° C. Higher temperatures resulted in faster initial rates (85% in 0.5 hours at 65.5° C.) but copper precipitation and gold co-precipitation became very pronounced at temperatures above 65° C., reducing gold extractions of about 85% down to 40% after 2 hours, even at 65.6° C. At 98.8° C. the gold extraction was only about 5% after 2 hours, with almost all (97%) of the initial copper in solution being precipitated. Thus, at least when leaching under a nitrogen atmosphere, temperatures in the range of 25° to 50° C. are recommended.

EXAMPLE 6

Similar tests were carried out to determine the effect of free ammonia in the leach, the range of 25 to 60 g.p.l. $NH_{3F}$ being tested. It should perhaps be noted that in previous Examples 4 and 5, the tests were carried out in ammoniacal solutions containing 20-30 g.p.l. $NH_{3F}$, which is sufficient to provide a free ammonia soluble metals molar ratio ($NH_{3F}$/Me) of at least 10:1 to 20:1. The leach was carried out at 48.9° C. with 130 g.p.l. ammonium thiosulphate, and with an added cupric ion concentration of 4.30 or 5.76 g.p.l. The results are shown in Table VI.

TABLE VI

| Initial $NH_{3F}$ (g/l) | Time (hr) | Solution Assays (g/l) | | | | | | Residue - Au | |
|---|---|---|---|---|---|---|---|---|---|
| | | Cu | Δ Cu | $S_T$ | $S(S_2O_3^=)$ | $NH_{3F}$ | pH | Assays (oz/Ton) | Extn (%) |
| 25 | 0 | 4.30 | | | | 25.5 | 9.6 | 0.188 | — |
| | 0.5 | | | | | 23.0 | 9.3 | 0.034 | 81.9 |
| | 1.0 | | | | | 19.8 | 9.25 | 0.022 | 88.3 |
| | 2.0 | 5.13 | +0.83 | 69.1 | 59.4 | 17.5 | 9.2 | 0.016 | 91.5 |
| 45 | 0 | 5.74 | | | | 47.5 | 9.55 | 0.188 | — |
| | 0.5 | | | | | 45.0 | 9.55 | 0.024 | 87.2 |
| | 1.0 | | | | | 41.0 | 9.30 | 0.015 | 92.0 |
| | 2.0 | 6.65 | +0.91 | 72.6 | 62.6 | 27.5 | 9.20 | 0.022 | 88.3 |
| 60 | 0 | 5.74 | | | | 62.5 | 10.0 | 0.188 | — |
| | 0.5 | | | | | 51.0 | 10.0 | 0.022 | 88.3 |
| | 1.0 | | | | | 47.5 | 10.0 | 0.013 | 93.1 |
| | 2.0 | 7.03 | +1.29 | 73.4 | 62.8 | 46.0 | 10.0 | 0.020 | 89.4 |

Although the ammonia concentration in solution diminished with time (being removed by the nitrogen purge), there was always sufficient free ammonia for an $NH_{3F}$/Me molar ratio greater than 6:1.

It will be seen that, over the range of free ammonium concentrations tested, there was no appreciable change in gold extractions. The results suggest the advisability of having sufficient free ammonia present to give an $NH_{3F}$/soluble Me molar ratio of at least 8:1.

EXAMPLE 7

The next tests were conducted to determine the difference between air and nitrogen sparging. Tests were carried out both with and without added cupric ions. As before, the charge contained 400 g.p.l. concentrate and 130 g.p.l. $(NH_4)_2S_2O_3$ and was conducted at 49° C. The results are shown in Table VII.

TABLE VII

| Atmosphere (sparge) | Initial $Cu^{2+}$ (g/l) | Time (hr) | Solution Assays (g/l) | | | | | | Residue - Au | |
|---|---|---|---|---|---|---|---|---|---|---|
| | | | Cu | Δ Cu | $S_T$ | $S(S_2O_3^=)$ | $NH_{3F}$ | pH | Assay (oz/Ton) | Extn (%) |
| Nitrogen | 0 | 0 | 0 | | | | 31.0 | 9.6 | 0.188 | — |
| | | 0.5 | | | | | 25.8 | 9.4 | 0.167 | 11.2 |
| | | 1.0 | | | | | 19.0 | 9.2 | 0.131 | 30.3 |
| | | 2.0 | 0.668 | +0.668 | 67.5 | 58.5 | 12.0 | 9.2 | 0.166 | 11.7 |
| Air | 0 | 0 | 0 | | | | 31.0 | 9.6 | 0.188 | — |
| | | 0.5 | | | | | 25.0 | 9.5 | 0.146 | 22.3 |
| | | 1.0 | | | | | 19.0 | 9.35 | 0.092 | 51.1 |
| | | 2.0 | 0.821 | +0.821 | 67.1 | 59.0 | 14.0 | 9.2 | 0.087 | 53.7 |
| Nitrogen | 5.74 | 0 | 5.74 | | | | 22.0 | 10.0 | 0.188 | — |
| | | 0.5 | | | | | 19.0 | 9.9 | 0.061 | 67.6 |
| | | 1.0 | | | | | 18.5 | 9.8 | 0.042 | 77.7 |
| | | 2.0 | 5.53 | −0.21 | 67.9 | 52.7 | 15.0 | 9.8 | 0.041 | 78.2 |
| Air | 5.74 | 0 | 5.74 | | | | 23.0 | 10.0 | 0.188 | — |
| | | 0.5 | | | | | 20.0 | 9.9 | 0.050 | 73.4 |
| | | 1.0 | | | | | 19.7 | 9.9 | 0.025 | 86.7 |
| | | 2.0 | 6.20 | +0.46 | 68.3 | 56.3 | 16.5 | 9.9 | 0.015* | 92.0* |

*Silver assay was 3.53 oz/ton = 22.9% extraction.

With nitrogen sparging, the addition of cupric ions increased gold extraction of 10-30% up to 67-78%. The use of air, even in the absence of added cupric ions, enabled an extraction of 52-53% gold, while the addition of 5.74 g.p.l. cupric ions results in a gold extraction of over 91%. It would appear that, in the air sparge tests with no initial added cupric ions, cupric ions were generated in situ and promoted gold extraction. These results are also interesting in that, when nitrogen was purged over the leach slurry, as in the previous examples, the gold extractions were some 15% higher than in the present test where nitrogen was sparged through the leach slurry. It is possible that the lower extraction is due, at least in part, to removal of entrained or soluble oxygen from the system by the sparging of nitrogen therethrough.

EXAMPLE 8

The effect of particle size on the ammonium thiosulphate leaching of the previously mentioned concentrate was tested. The concentrate was ground for various periods of time in a ceramic ball mill, up to 98% minus 40μ. It is interesting that there was little change in surface area of the sulphides, the values ranging from 0.6 – 1.6 m²/g. The leaches were carried out at 3 g.p.l. cupric ions, 100 g.p.l. ammonium thiosulphate at 50° C. and with air sparging. The results are shown in Table VIII.

nantly an iron oxide assaying (%) 0.31 Cu, 47.5 Fe, 0.08 Zn, 8.2 S and (oz/T) 5.02 Ag and 0.303 Au, represented main leach extractions of 98.99% Cu and Zn and 85–90% S. Samples of filtered and washed residue were conditioned for 1.0 hour at pH ~ 10 with either sodium hydroxide, calcium hydroxide or ammonium hydroxide and subsequently leached as a slurry containing 150 g.p.l. solids with ammoniacal thiosulphate containing initially 100 g.p.l. ammonium thiosulphate, 5 g.p.l. cupric ions (added as $Cu(NH_3)_4SO_4$ solution) and 30 g.p.l. free ammonia. The thiosulphate leach was conducted at 35° C. for 5 hours with an air sparge of approximately 1 liter per minute. The results are shown in Table IX.

TABLE IX

| Conditioning Base | Final Filtrates (gpl) | | | Residues | | | |
|---|---|---|---|---|---|---|---|
| | | | | Assays (oz/ton) | | Extractions (%) | |
| | Cu | $NH_{3F}$ | pH | Au | Ag | Au | Ag |
| NaOH | 5.42 | 15.0 | 9.75 | 0.023 | 0.817 | 92.4 | 83.7 |
| Ca(OH)₂ | 4.34 | 28.0 | 10.0 | 0.015 | 1.69 | 95.0 | 66.3 |
| NH₄OH | 5.08 | 17.0 | 9.90 | 0.013 | 4.52 | 95.8 | 10.0 |

It will be noted that good gold extractions are achieved by thiosulphate leaching of the residue of a "super

TABLE VIII

| Grind Time (hrs) | Buckbee Screen % passing | | Surface Area m²/g | Leach Time (hrs) | Solution Assays (gpl) | | | | | EMF* MV | Residue Au | |
|---|---|---|---|---|---|---|---|---|---|---|---|---|
| | 40μ | 10μ | | | Cu | Δ Cu | $S(S_2O_3^=)$ | $NH_{3F}$ | pH | | Assays oz/T | Extn % |
| 0 | 40 | 18 | 1.2 | 0 | 3.04 | | 42.0 | 23.0 | 9.90 | n.a. | 0.168 | |
| | | | | 0.5 | | | | 27.5 | 9.90 | | 0.037 | 78.0 |
| | | | | 1.0 | | | | 27.0 | 9.90 | | 0.016 | 90.5 |
| | | | | 2.0 | 3.67 | +0.63 | 45.4 | 27.5 | 9.90 | | 0.0087 | 94.8 |
| 0.5 | 74 | 28 | 0.6 | 0 | 3.04 | | 42.0 | 27.0 | 9.90 | n.a. | 0.168 | |
| | | | | 0.5 | | | | 30.0 | 9.90 | | 0.032 | 81.0 |
| | | | | 1.0 | | | | 30.0 | 9.90 | | 0.012 | 92.9 |
| | | | | 2.0 | 3.83 | +0.79 | 42.3 | 32.5 | 9.90 | | 0.012 | 92.9 |
| 1.0 | 92 | 40 | 1.6 | 0 | 3.04 | | 42.0 | 22.5 | 10.0 | −185 | 0.168 | |
| | | | | 0.5 | | | | 23.0 | 10.0 | −160 | 0.020 | 88.1 |
| | | | | 1.0 | | | | 20.5 | 9.95 | −155 | 0.013 | 92.3 |
| | | | | 2.0 | 3.06 | +0.02 | 44.2 | 30.0 | 9.95 | −165 | 0.031 | 81.6 |
| 2.0 | 98 | 50 | 1.4 | 0 | 3.04 | | 42.0 | 24.0 | 10.1 | −190 | 0.168 | |
| | | | | 0.5 | | | | 25.5 | 10.0 | −180 | 0.012 | 92.9 |
| | | | | 1.0 | | | | 23.8 | 10.0 | −160 | 0.020 | 88.1 |
| | | | | 2.0 | 3.30 | −0.26 | 45.4 | 31.0 | 9.9 | −185 | 0.022 | 56.9 |

*S.C.E. vs Platinum

There is a more or less linear relationship between grind time and initial gold extraction rates with, for example, the 0.5 hour extractions ranging from 78.0 to 92.9%. However, after 0.5 hour, the fine ground sulphides promoted the precipitation of some of the copper as sulphide (with the rate of sulphide precipitation exceeding the rate of oxidation and resolubilization of the copper at the rate of air sparging) resulting in corresponding co-precipitation of the gold.

The highest extraction at 2 hours of 94.8% was obtained with the unground concentrate. This is therefore why it is recommended that the concentrate should be only lightly ground.

EXAMPLE 9

In a main leach of the "super leach" kind, 200 g.p.l. concentrate assaying (%) 24.7 Cu, 29.9 Fe, 4.29 Zn, 34.4 S was leached in water at 234° C. under 100-150 p.s.i.g. oxygen overpressure for 2 hours. The residue, predomileach."

EXAMPLE 10

Gold and silver were recovered from an ammonium thiosulphate leach liquor by cementation with zinc dust (96% minus 10 microns). Various concentrations of zinc dust were used, both with and without prior reduction of soluble cupric copper to cuprous by sulphur dioxide. The leach liquor had been obtained in a thiosulphate leach of the residue of an ammoniacal main leach of chalcopyrite. The soluble copper content had initially been partly cuprous and partly cupric but, on storage, had been oxidized by air to cupric. The cementations were conducted with 500 ml samples of solution at 23° C. and at atmospheric pressure, with a nitrogen purge and agitation provided by a magnetic stirrer. The results are shown in Table 10.

TABLE 10

| Reagent | Feed Pretreatment | Reagent Feed (gpl) | Reagent Product (gpl) | Filtrate Assays | | | | | | Removal (%) | |
|---|---|---|---|---|---|---|---|---|---|---|---|
| | | | | pH | Cu | $NH_{3F}$ | $S_T$ | $S(S_2O_3^=)$ | Au (mgpl) | Ag (mgpl) | Au | Ag |
| Head Solution (Leach liquor) | | | | 10.2 | 6.76 | 35.4 | 34.7 | 19.6 | 2.20 | 36.8 | | |
| Zinc | None | 10.0 | 14.4 | 9.75 | 0.004 | 24.8 | 33.7 | 18.9 | <0.05 | 2.1 | >97.7 | 94.2 |
| | | 6.0 | 7.6 | 9.9 | 0.125 | 29.0 | | | <0.05 | 1.9 | <97.7 | 94.8 |
| | | 2.0 | 0.40 | 10.0 | 6.57 | 23.0 | | | 1.94 | 19.6 | 11.8 | 46.7 |

TABLE 10-continued

| Reagent | Feed Pretreatment | Reagent Feed (gpl) | Reagent Product (gpl) | pH | Filtrate Assays Cu (gpl) | Filtrate Assays $NH_{3F}$ (gpl) | Filtrate Assays $S_T$ (gpl) | Filtrate Assays $S(S_2O_3^=)$ (gpl) | Au (mgpl) | Ag (mgpl) | Removal Au (%) | Removal Ag (%) |
|---|---|---|---|---|---|---|---|---|---|---|---|---|
| | $SO_2$ to reduce $Cu^{2+}$ to $Cu^+$ | 6.0 | 8.3 | 8.25 | 0.048 | 14.4 | | | <0.05 | 1.9 | <97.7 | 94.8 |
| | | 2.0 | 3.48 | 8.70 | 3.44 | 14.9 | | | <0.05 | 1.9 | >97.7 | 84.8 |

These results clearly show that the prior reduction of soluble copper from cupric to cuprous significantly lowers the amount of zinc dust required to effectively remove the gold and silver. Without cupric reduction, zinc dust feed of the order of 6 g.p.l. is required for effective results, with 2 g.p.l. giving very poor gold and silver removal. On the other hand, zinc dust feed of 2 g.p.l. after cupric reduction gives excellent results, namely over 97% gold and over 94% silver removal.

With regard to the removal of gold and silver from the thiosulphate leach liquor, reduction of soluble copper from cupric to cuprous, followed by cementation with zinc dust, has been shown to be an effective method of removal. It is possible to conduct the thiosulphate leach so that most of the soluble copper is cuprous, thereby lessening the amount of cupric copper to be reduced prior to cementation. This may be done for example by providing air only in the initial stages of the thiosulphate leach, with the latter stages conducted in the absence of air to enable the cupric copper to be reduced to cuprous copper by the sulphides or thiosulphate sulphur. Similar results may be achieved by conducting the leach in a countercurrent manner. However, it is advisable to ensure that at least some soluble copper is retained in the leach as cupric copper to prevent precipitation of soluble copper, with subsequent loss of gold and silver by co-precipitation therewith.

It is also possible to recycle the crude precious metals residue from the filtration step 34 back to the cupric reduction step 30, in conjunction with or, possibly, in place of the sulphur dioxide. Copper in the precious metals residue will act as a reductant for the cupric copper. At the same time, a significant portion of the copper in the crude precious metals residue will be solubilized, thereby upgrading the precious metals residue.

Also, the cementation could be carried out with copper powder instead of zinc dust, and sulphites could be used in place of sulphur dioxide for cupric reduction. Further, hydrogen sulphide or ammonium sulphide may be used as alternatives to copper powder or zinc dust to effect removal of the gold and silver.

The alternative methods described above for removal of gold and silver from the thiosulphate leach liquor do not involve destruction of the thiosulphate, and such methods are therefore generally to be preferred. However, there may be circumstances where other methods may offer some advantage.

For example, oxidation of all or most of the ammoniacal thiosulphate sulphur in the leach liquor to sulphate at elevated temperature and oxygen overpressure may facilitate the recovery of the precious metals, which may be carried out by precipitation by hydrogen sulphide, sodium sulphide or ammonium sulphide, or by removal by a related thiol group of commercially available ion exchange resins. Cementation with copper or zinc dust may also be used. These methods may be used with or without prior removal of cupric copper, for example, by liquid or solid ion exchange. Also, gold can be recovered from the oxidized liquor by selective adsorption by activated charcoal, leaving most of the silver in the solution for subsequent recovery, thereby enabling the gold and silver to be separately recovered.

Although precious metal recovery methods involving the destruction of the thiosulphate may seen unattractive, it will be observed that, in the process described with reference to FIG. 1, there will be a gradual build-up of ammonium sulphate in the thiosulphate circuit, since the ammonium sulphate will enter the circuit along with cupric copper as entrained main leach liquor with the main leach residue arriving at repulp step 16. It will therefore probably be necessary to provide a suitable bleed from the thiosulphate circuit, and precious metals may be recovered from the bleed stream by the methods suggested above, involving the destruction of the thiosulphate. The depleted bleed stream could then be recycled to the main leach circuit.

Thus, gold, and possibly also silver, therefore can, in accordance with the invention, be recovered on a commercial scale from copper bearing sulphidic concentrates which are treated for recovery of copper by leaching under oxidizing conditions, the precious metals recovery treatment being carried out either on the unleached concentrate or on the residue from the copper recovery leach. Which precious metals recovery treatment is used depends, among other things, on the initial precious metals content and the nature of the recovery required. Slightly better gold recovery appears to be obtained by treating the concentrate, but much better silver recovery is obtained by treatment of the copper leach residue.

The effects of varying different ammonium thiosulphate leach conditions has been indicated and various embodiments, with specific examples thereof, have been described. Other embodiments within the scope of the invention will be apparent to one skilled in the art, the scope of the invention being defined in the appended claims.

What we claim as new and desire to protect by Letters Patent of the United States is:

1. A process for the recovery of gold as well as copper values from copper bearing sulphidic material containing gold, including subjecting the copper bearing sulphidic material to a main leach under oxidizing conditions to provide a copper containing main leach liquor and a main residue, and subjecting said copper bearing sulphidic material before said main leach or said main leach residue from said main leach to a secondary leach with ammonium thiosulphate solution to provide a gold containing secondary leach liquor and a secondary residue, and separating said gold containing secondary leach liquor from the secondary residue.

2. A process according to claim 1 wherein the main leach is carried out with an ammonium salt containing ammoniacal aqueous leach medium.

3. A process according to claim 2 wherein the copper bearing sulphidic material is chalcopyrite and the ammonium salt is ammonium sulphate.

4. A process according to claim 3 wherein the chalcopyrite is subjected to said secondary leach with ammonium thiosulphate solution to provide said gold containing leach liquor before being subjected to said main leach.

5. A process according to claim 3 wherein said main residue from said main leach is subjected to said secondary leach with ammonium thiosulphate solution to provide said gold containing leach liquor.

6. A process according to claim 2 wherein the thiosulphate leach is carried out in the presence of added cupric ions.

7. A process according to claim 6 wherein the addition of cupric ions is sufficient to provide a cupric ion concentration in the range of 1 to 10 g.p.l.

8. A process according to claim 7 wherein the addition of cupric ions is sufficient to provide a cupric ion concentration in the range of 2 to 4 g.p.l.

9. A process according to claim 2 wherein the thiosulphate leach is carried out in the presence of free ammonia sufficient to provide a free ammonia to soluble metals molar ratio of at least 4 to 1.

10. A process according to claim 1 wherein the ammonium salt is ammonium sulphate.

11. A process according to claim 1 wherein the copper bearing sulphidic material is chalcopyrite.

12. A process according to claim 1 wherein the thiosulphate leach is carried out with an ammonium thiosulphate concentration in the range of 10 to 150 g.p.l.

13. A process according to claim 12 wherein the thiosulphate leach is carried out with an ammonium thiosulphate concentration in the range of 60 to 120 g.p.l.

14. A process according to claim 1 wherein the thiosulphate leach is carried out at a temperature between 20° and 65° C.

15. A process according to claim 14 wherein the thiosulphate leach is carried out at a temperature between 25° to 50° C.

16. A process according to claim 1 wherein the thiosulphate leach is carried out substantially at atmospheric pressure in the presence of free oxygen.

17. A process according to claim 1 wherein the thiosulphate leach is carried out in an inert atmosphere.

18. A process according to claim 1 wherein the copper bearing sulphidic material is subjected to said secondary leach with ammonium thiosulphate to provide said gold containing leach liquor before being subjected to said main leach and the cupriferous sulphidic material has a particle size in the rane of 60% minus 200 mesh to 95% minus 325 mesh.

19. A process according to claim 1 wherein the copper bearing sulphidic material also contains silver, and silver is leached from said copper bearing sulphidic material or said main residue in said secondary leach and is present in solution in said gold containing leach liquor.

20. A process according to claim 1 wherein the main leach is carried out at a temperature in the range of 160° to 230° C. with a free oxygen partial pressure in the range of 50 p.s.i.g. to 200 p.s.i.g. in an acid producing leach medium.

21. A process according to claim 20 wherein the main leach residue is subjected to the secondary leach with ammonium thiosulphate solution, the main leach residue first being conditioned in an alkaline medium.

22. A process according to claim 1 wherein gold is removed from the secondary leach liquor by cementation with at least one of the metals copper and zinc.

23. A process according to claim 22 wherein, before said cementation, soluble cupric copper in the secondary leach liquor is reduced to cuprous copper.

24. A process according to claim 23 wherein said reduction is carried out with sulphur dioxide.

25. A process for the recovery of gold as well as copper values from copper bearing sulphidic material containing gold, including subjecting the copper bearing material to a main leach to dissolve a substantial amount of copper without dissolving a substantial amount of gold and provide a copper containing main leach liquor and gold containing main residue, separating the main residue from the main leach liquor, subjecting the main leach residue to a secondary leach with the ammonium thiosulphate solution in the presence of cupric ammine ions to dissolve a substantial amount of gold and provide a gold containing secondary leach liquor and a secondary residue, with the copper of at least some of the cupric ammine ions emanating from the copper bearng sulphidic material, and separating said gold containing secondary leach liquor from the secondary.

26. A process according to claim 25 wherein the copper of at least some of the cupric ammine ions is obtained from said main leach liquor.

27. A process for the recovery of gold as well as copper from copper bearing sulphidic material containing gold, including subjecting the copper bearing sulphidic material to a secondary leach with ammonium thiosulphate solution in the presence of cupric ammine ions to dissolve substantial amount of gold without dissolving a substantial amount of copper and provide a gold containing secondary leach liquor and a copper containing secondary residue with the copper of at least some of the cupric ammine ions emanating from the copper bearing sulphidic material, separating said gold containing secondary leach liquor from the secondary residue, subjecting the copper containing secondary residue to a main leach to dissolve a substantial amount of copper and provide a copper containing main leach liquor and a main residue, and separating the copper containing main leach liquor from said main residue.

28. A process according to claim 27 wherein said main leach is an ammoniacal leach and some of said copper containing main leach liquor is recycled to said secondary leach to provide at least some of said cupric ammine ions.

29. A process according to claim 1 wherein the copper bearing sulphidic material also contains silver, silver is leached from said copper bearing sulphidic material or said main residue in said secondary leach and is present in solution in said gold containing leach liquor, and the main leach is carried out at a temperature in the range of 160° to 230° C. with a free oxygen partial pressure in the range of 50 p.s.i.g. to 200 p.s.i.g. in acid producing leach medium.

* * * * *